United States Patent
Hsu et al.

(10) Patent No.: US 8,878,602 B1
(45) Date of Patent: Nov. 4, 2014

(54) REDUCING NOISE EFFECTS IN AN ELECTRONIC COMPUTING DEVICE

(71) Applicant: Amazon Technologies, Inc., Reno, NV (US)

(72) Inventors: Morris Yuanhsiang Hsu, Sunnyvale, CA (US); Chirag Saurabh Bhavsar, Santa Clara, CA (US); In Chul Hyun, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/797,956

(22) Filed: Mar. 12, 2013

(51) Int. Cl.
*H03K 5/00* (2006.01)
*H05K 9/00* (2006.01)

(52) U.S. Cl.
CPC .................................. *H05K 9/0064* (2013.01)
USPC ............................ 327/553; 327/552; 361/119

(58) Field of Classification Search
USPC ................................. 327/551–559; 361/119
See application file for complete search history.

(56) References Cited

U.S. PATENT DOCUMENTS 6,424,522 B1 * 7/2002 Lin et al. .................... 361/679.4
7,196,893 B2 * 3/2007 Herrmann .................... 361/119

* cited by examiner

*Primary Examiner* — Dinh Le
(74) *Attorney, Agent, or Firm* — Novak Druce Connolly Bove + Quigg LLP

(57) ABSTRACT

Approaches are described for managing effects such as interference, crosstalk, and other types of noise in an electronic environment using a physical and/or electronic switch to improve antenna performance. For example, in the situation where the connector is connected to the device and no data and/or power is being transferred through the connector, the switch is caused to be open. In this situation, because the connector will be an electrically floating metal instead of a grounded metal due to the open switch, at least a portion of the radiated and/or received antenna signals will not couple to the connector. In the situation where the connector is connected to the device and is being used to transfer data and/or power, the switch is caused to be closed, which will result in the connector being grounded. In such a situation, at least a portion of the noise generated by the connector due to transferring data and/or power will be grounded instead of being coupled to the antenna.

25 Claims, 6 Drawing Sheets

US 8,878,602 B1

REDUCING NOISE EFFECTS IN AN ELECTRONIC COMPUTING DEVICE

BACKGROUND

Users demand smaller electronic devices that offer increasing processing capacity and functionality. However, a downside to providing smaller devices with increased functionality is that a greater number of components are packaged into a smaller device volume, and these components may electrically interfere with one another. For example, certain sensitive device components, such as an antenna, may need to coexist with noise generating components, such as a data connector. Co-locating data connectors with device antennas can pose several problems. For example, in an ideal antenna environment there should be no metals in an effective antenna volume for optimal antenna performance. However, most data and/or power transfer connectors, such as a universal serial bus (USB) connector, are typically made of metal, and placing such a connector near an antenna (such as when connecting the connector to the device) can impact antenna performance. Further, a data and/or power transfer connector can be a noise source when in use, and an antenna in close proximity to the connector can pick up at least a portion of the radiated noise, which can also impact antenna performance. Accordingly, device manufacturers are increasingly being challenged with the task of designing antenna arrangements that provide desired operating characteristics within a relatively limited amount of space available for antennas.

BRIEF DESCRIPTION OF THE DRAWINGS

Various embodiments in accordance with the present disclosure will be described with reference to the drawings, in which.

DETAILED DESCRIPTION

Figure 1:
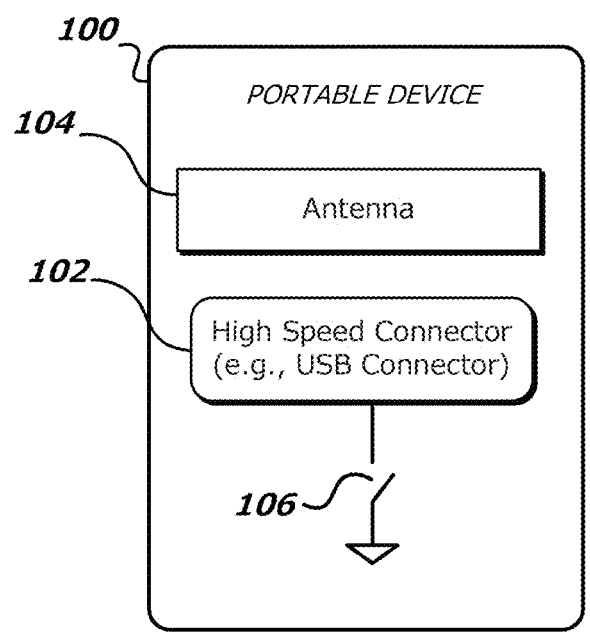
FIG. 1 illustrates an example implementation for managing noise in an electronic environment, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches for managing effects such as interference, crosstalk, and other types of noise in an electronic environment. In particular, various embodiments enable a component such as at least one antenna of a computing device (e.g., a mobile phone, tablet computer, etc.) or other electronic device to be collocated, or otherwise placed in proximity, with one or more potential noise producing components, such as a data and/or power connector, which can interfere or otherwise degrade the performance of the antenna(s).

In certain devices, it can be preferable that no metal, except ground, is near or around the antenna in order for the antenna to operate properly. Thus, a connector (which is typically made of metal) for a data or communication component that is collocated with an antenna, such as in the case of connecting (e.g., plugging) the connector to the device, can impact antenna performance. For example, when the connector is connected to the device to transfer data and/or power, the connector can generate noise at one or more frequencies at which the antenna operates, and the noise can couple to the antenna which can impact antenna performance. When the connector is connected to the device and is not in operation (e.g., the connector is not being used to transfer data and/or power), radiated and/or received signals of the antenna can couple to the metal of the connector, which can also impact antenna performance.

Accordingly, in accordance with various embodiments, a physical and/or electronic switch, or other such component, can be used manage effects such as interferences, crosstalk, and other types of noise to improve antenna performance, at least for situations involving a grounded metal near the antenna (such as in the case of connecting the connector to the device) and having an active connector (e.g., a connector that is transferring data and/or power) near the antenna. For example, in the situation where the connector is connected to the device and no data and/or power is being transferred through the connector, the switch is caused to be open, or in some situations, the switch is already open. In this instance, because the connector will be an electrically floating metal instead of a grounded metal due to the open switch, at least a portion of the radiated and/or received antenna signals will not couple to the connector. In other embodiments, the switch is already open, and a received activation signal can cause the switch to close. For example, in the situation where the connector is connected to the device and is being used to transfer data and/or power, the switch is caused to be closed, which will result in the connector being RF grounded. In such a situation, at least a portion of the noise generated by the connector due to transferring data and/or power will be grounded instead of being coupled to the antenna. In at least these situations, controlling the electrical behavior of the connector can be used to provide optimal antenna performance.

Various other functions and advantages are described and suggested below as may be provided in accordance with the various embodiments.

As mentioned above, portable computing devices (such as mobile phones) can include multiple antennas and components packaged in a relatively limited amount space. This can result in placing an antenna next to one or more potential noise producing components, such as a data connector (e.g., a Universal Serial Bus (USB) connector or a high-definition multimedia interface (HDMI) connector). As described, co-locating or otherwise placing in close proximity a high-speed data connector, e.g., a USB connector, and an antenna can potentially impact antenna performance. For example, in certain devices, it can be preferable that no metal, except ground, is near or around the antenna for optimal antenna efficiency, where antenna efficiency is a measure of the efficiency with which a radio antenna, such as the one found in portable computing devices, converts radio-frequency power accepted at its terminals into radiated power. However, a connector, such as a USB connector, is typically made of metal, and can degrade antenna efficiency by grounding received and/or radiated signals of the antenna.

Further, the connector can act as a noise source when transferring data and/or power. For example, noise radiated from the connector can couple to the antenna, causing significant degradation to radio frequency (RF) receiver sensitivity (i.e., the ability of the antenna to receive the required level of radio signals). As such, it is desirable to provide an antenna arrangement that can operate at desired characteristics within the relatively limited amount of space found in portable computing devices.

Conventional methods either route the antenna away from the noise producing component, or place the noise producing component in a location that is least likely to impact antenna performance. However, moving any noise producing components away from the antenna ignores industrial design considerations and/or user experience considerations, where the placement of components in an electronic device can impact aesthetics and/or usability of the device. Further, moving the antenna away from the noise producing component can result in less routable space for the antenna, which can also impact antenna performance. In accordance with various embodiments, systems and methods provide for controlling the behavior of at least one device component to reduce an amount of noise that can potentially impact antenna performance.

FIG. 1 illustrates an example implementation for managing noise in an electronic environment, in accordance with an embodiment. As shown in FIG. 1, a portable computing device 100 (e.g., a mobile phone) includes, for example, an antenna 104 and a switch 106. Optionally attached to the device is connector 102, e.g., a USB connector. Although a portable computing device (e.g., a mobile phone) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, and portable players, among others. It should be understood that although embodiments described herein reference a USB connector, any connector can be used, such as, but not limited to a HDMI connector, a peripheral component interconnect (PCI) Express connector, a Thunderbolt connector, or any other connector type.

The antenna, for example, is an electrical device which converts electric power into radio waves, and vice versa. It is usually used with a radio transmitter or radio receiver. In transmission, a radio transmitter supplies an oscillating radio frequency electric current to the antenna's terminals, and the antenna radiates the energy from the current as electromagnetic waves (radio waves). In reception, an antenna intercepts some of the power of an electromagnetic wave in order to produce a tiny voltage at its terminals that is applied to a receiver to be amplified.

The switch, in this example, can be caused to be open or closed, and can be used to control whether the connector is grounded (i.e., RF ground) or floating. In this way, the switch can be used to manage noise in the computing device. For example, when the switch is caused to be open, the connector is electrically floating (i.e., the connector is not electrically connected to a reference point). This allows the antenna to achieve maximum antenna efficiency since at least a portion of the radiated and/or received antenna signal will not couple to the electrically floating connector. When the switch is caused to be closed, the connector is electrically grounded (i.e., electric current, such as noise produced by the connector has a direct path to ground), which can reduce data transfer and charging noise since at least a portion of the noise will be grounded instead of being coupled to the antenna. In accordance with an embodiment, various components can be used as the switch, including, but not limited to, pin diodes (or other diodes), transistors (e.g., BJTs, FETs, CMOSs), or any other electronic and/or mechanical switch.

Figure 2A:
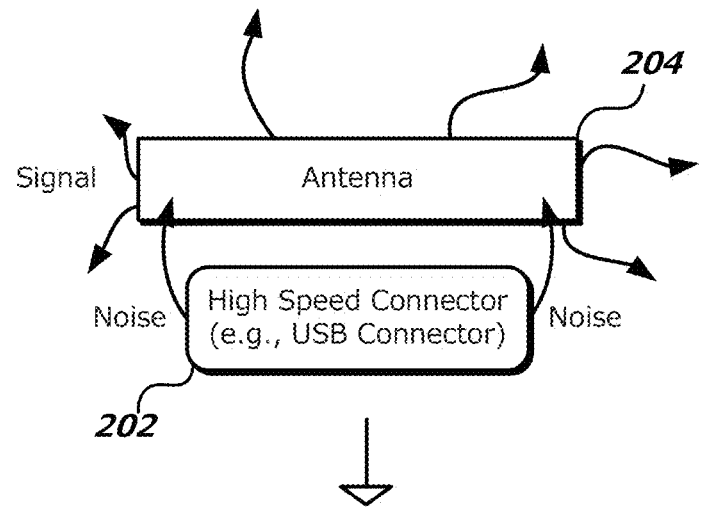
FIGS. 2A-2C illustrate example situations where noise produced by a connector can impact antenna performance, in accordance with various embodiments.

As described, in conventional electronic devices, the presence and/or operational activity of a connector can impact antenna performance (i.e., antenna efficiency and/or RF receiver sensitivity). For example, as shown in FIG. 2A, connector 202 is electrically floating. Thus, in this situation, the connector is not grounded and received and/or radiated signals of the antenna will not couple to the connector. However, when the connector is used for transferring data and/or power, at least a portion of any noise produced by the connector will couple to antenna 204. This can cause receiver desensitization, where the noise generated by the connector can cause a form of electromagnetic interference in which the antenna is unable to receive a communication signal that it might otherwise be able to receive when there is no interference.

Figure 2B:
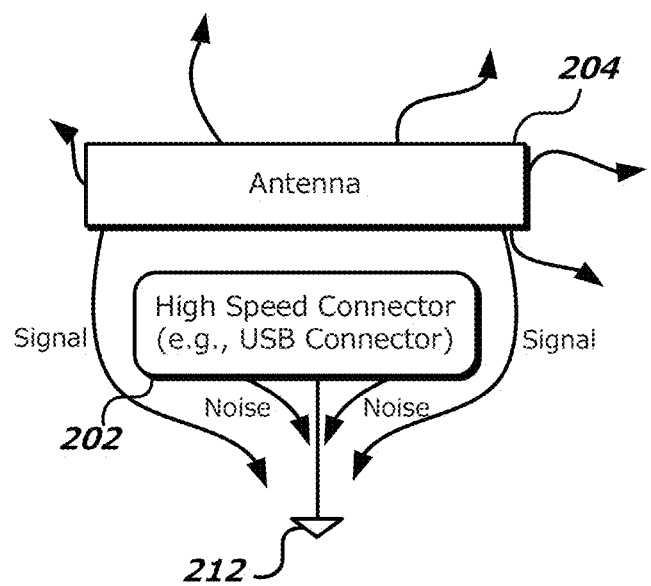

On the other hand, as shown in FIG. 2B, connector 202 is electrically grounded 212. In this case, at least a portion of any noise generated by the connector will have a path to ground. In such a situation, the noise will be grounded instead of being coupled to the antenna. However, because the connector is grounded, at least a portion of the signals radiated or received by the antenna will couple to the grounded connector, which can impact antenna performance.

Figure 2C:
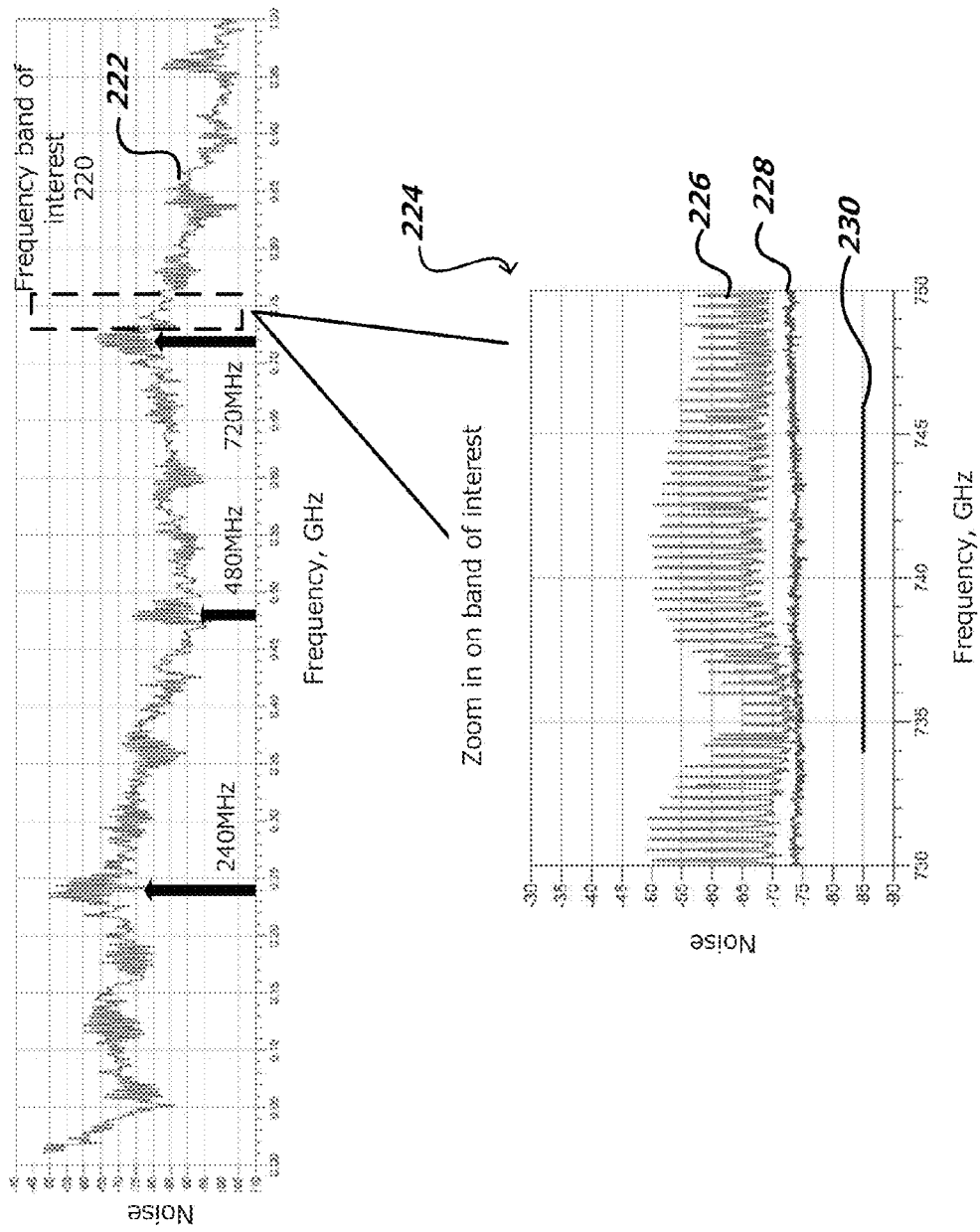

FIG. 2C illustrates an example of noise as seen on an antenna due to transferring data and/or power to the device through the connector when the connector is an electrically floating metal instead of a grounded metal. As described above, when the connector is connected to the device to transfer data and/or power, the connector can generate noise at one or more frequencies at which the antenna operates, and the noise can couple to the antenna which can impact antenna performance. As shown in FIG. 2C, line 222 illustrates the noise on the antenna (e.g., antenna 204) for a range of frequencies (e.g., frequencies 0 to 1 GHz). In this situation, the frequency at which the connector can transfer data is 240 MHz, with harmonics at 480 MHz and 720 MHz. Box 220 represents the frequency range of interest (e.g., the band of interest) to which noise is being picked up by the antenna. It should be noted that although other communication components transfer data at other frequencies, embodiments described herein can apply to any component capable of transferring data at any frequency.

Graph 224 illustrates a zoomed in view of the frequency range of interest. As illustrated in graph 224, line 226 represents the noise generated by the connector that is coupled to the antenna, line 228 represents the noise on the antenna when the connector is not transferring data and/or power to the antenna, and line 230 represents the frequency range of interest (i.e., 734 GHz to 746 GHz). As illustrated in graph 224, when the connector is transferring data and/or power to the device, a considerable amount of noise is coupled to the antenna, which can result in suboptimal antenna performance. Accordingly, in at least these situations, managing noise by controlling the electrical behavior of the connector can be used to provide optimal antenna performance.

Figure 3:
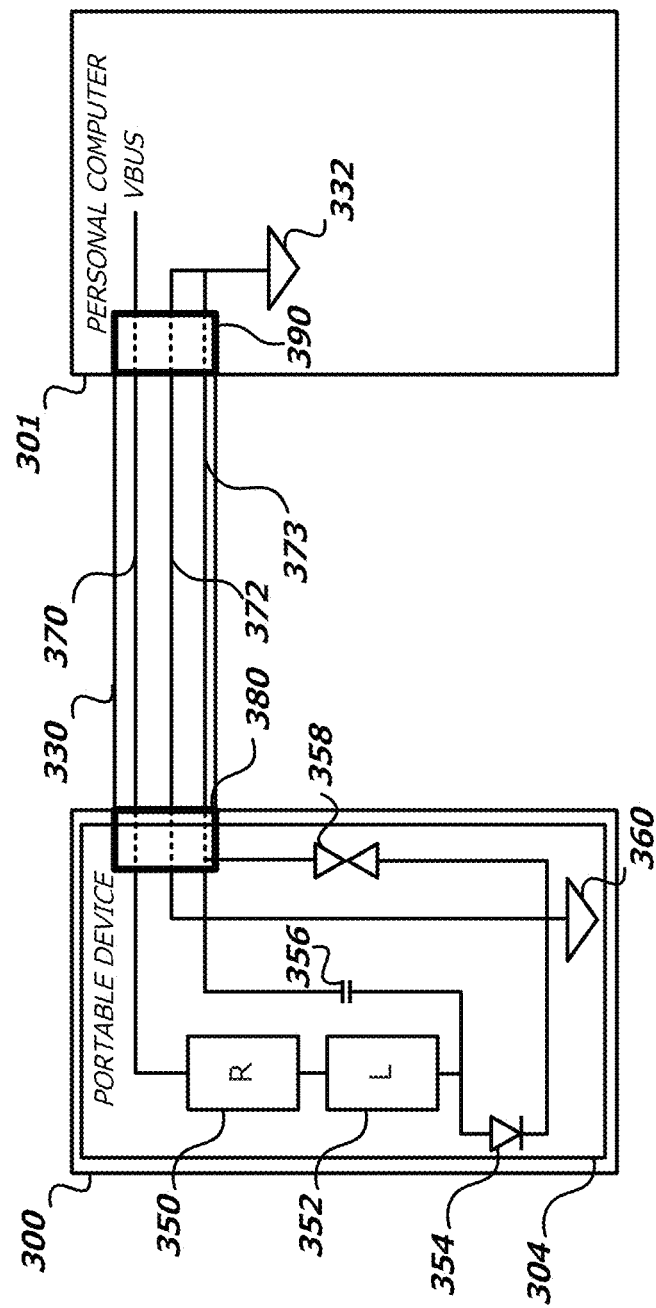
FIG. 3 illustrates an example implementation for managing noise in an electronic environment, in accordance with alternate embodiments.

For example, FIG. 3 illustrates an example implementation for controlling the behavior of device components, in accordance with an embodiment. As described, a switch, such as a pin diode can be used to control whether a connector, such as a high-speed connector used to transfer data and/or power, is electrically grounded or electrically floating to manage noise capable of affecting antenna performance. For example, when the connector is transferring data and/or power to an electronic device (e.g., a mobile phone), the switch is caused to be closed, which can result in RF grounding the connector. In such a situation, at least a portion of the noise generated by the connector due to transferring data and/or power will be grounded instead of being coupled to the antenna. When the connector is connected to the device and no data and/or power is being transferred through the connector, the switch is caused to be open. In this situation, because the connector will be electrically floating metal instead of grounded metal due to the open switch, at least a portion of the radiated and/or received antenna signals bypass the connector.

As shown in FIG. 3, a portable computing device 300 (e.g., a mobile phone) is connected to a personal computer 301 through a communication transfer cable 330 that can transfer data and/or power between electronic or other devices. Examples of communication cables include a USB cable and a HDMI cable, among others. Although a communication cable is shown, any communication component can be utilized in the various embodiments described herein. Further, although a portable computing device and a personal computer are shown, it should be understood that any electronic device capable of receiving, providing, and/or processing a communication or power signal can be used in accordance with various embodiments discussed herein, where the devices can include, for example, desktop computers, notebook computers, personal data assistants, video gaming consoles, television set top boxes, smart televisions, wall adapters, and portable players, among others.

In this example, a first end of the cable includes connector 380 that can connect or otherwise plug into the portable computing device, and a second end of the cable includes connector 390 that can connect or otherwise plug into the personal computer. The cable includes power line 370 and ground lines 372 and 373. The power line can connect to a power source, such as VBUS of the personal computer, and can provide an activation signal, such as a biasing voltage to switch 354 that can cause the switch open and close.

The portable computing device, in this example, includes control circuitry (e.g., noise reduction circuitry that includes a biasing resistor 350, a direct current (DC) feed inductor 352, a switch 354 (e.g., a pin diode), a DC blocking capacitor 356, and an electrostatic discharge (ESD) diode 358. Biasing resistor 350 is connected to DC feed inductor 352 and is capable of connecting to power line 370 that connects to VBUS when cable 330 connects portable computing device 300 and personal computer 301. In accordance with an embodiment, VBUS can be 5V or some other appropriate voltage, and can be used to cause the switch to activate and/or deactivate (i.e., can cause the switch to close or open). It should be noted that although VBUS, in this example, is supplied by the personal computer, in various other embodiments, VBUS can be supplied by the portable computing device or any other power source.

When the device side connector 380 is connected to the portable computing device and the personal computer side connector 390 is connected to the personal computer, a biasing current supplied by VBUS through biasing resistor 350 and DC feed inductor 352 can be used to activate switch 354. For example, biasing resistor 350 and DC feed inductor 352 can be used to bias switch 354 to short connector 380 to a ground 360 of the device.

As described above, grounding connector 380 to the ground 360 of the device causes at least a portion of the noise produced by connector 380 to couple to the ground of the device instead of antenna 304. When connector 380 is disconnected from the portable computing device or connector 390 is disconnected from the personal computer, the biasing current provided by VBUS is removed. In this situation, the switch is caused to be electrically open, providing an open circuit between connector 380 and device ground 360. As described above, because connector 380 will be electrically floating metal instead of a grounded metal due to the open switch, at least a portion of the radiated and/or received antenna signals will not couple to connector 380, which provides isolation to the device ground for optimal antenna efficiency. Additionally, DC feed inductor 352 can be used to increase antenna isolation to ground since the DC feed inductor acts as a short at DC, and at all other frequencies, an open circuit.

In accordance with an embodiment, the noise reducing circuitry can include various other components. For example, as shown in FIG. 3, a DC blocking capacitor 356 is connected to ground line 373 and switch 354. The DC blocking capacitor can be used to prevent DC shorting of the switch to personal computer ground 332, which can deactivate the switch by directing all biasing current away from the switch. ESD diode 358 is connected to ground line 373 and device ground 360. The ESD diode can be used for ESD protection, e.g., to protect the portable computing device from the sudden flow of electricity due to the shorting and opening of the switch or the sudden flow of electricity from other device (or non-device) components.

In accordance with various embodiments, switch 354 can be controlled in a number of different ways. For example, as described above, switch 354 can be controlled by detecting the presence of VBUS or any activation signal. For example, the activation signal can cause the switch to electrically close, where the resistance between connector 380 and the ground of the device can be near zero (e.g., less than an ohm). This effectively shorts connector 380 to the ground of the device, which advantageously can decrease desensitization noise since at least a portion of any noise generated by transferring data and/or power through connector 380 is grounded instead of coupling to the antenna. Further, the activation signal can cause the switch to be electrically open, where the isolation between connector 380 and the ground of the device can be at or near, e.g., 19 db, which effectively creates an RF open circuit. The higher isolation (e.g., as measured in decibels) will reduce the impact to antenna efficiency because at least a portion of radiated and/or received antenna signals will not couple to the connector. In accordance with various other embodiments, the activation signal can be a change (or presence) of capacitance, resistance, sound, light, etc. In various other embodiments, the switch can be a mechanical switch, where an activation signal can be used to mechanically open and close the switch.

Figure 4:
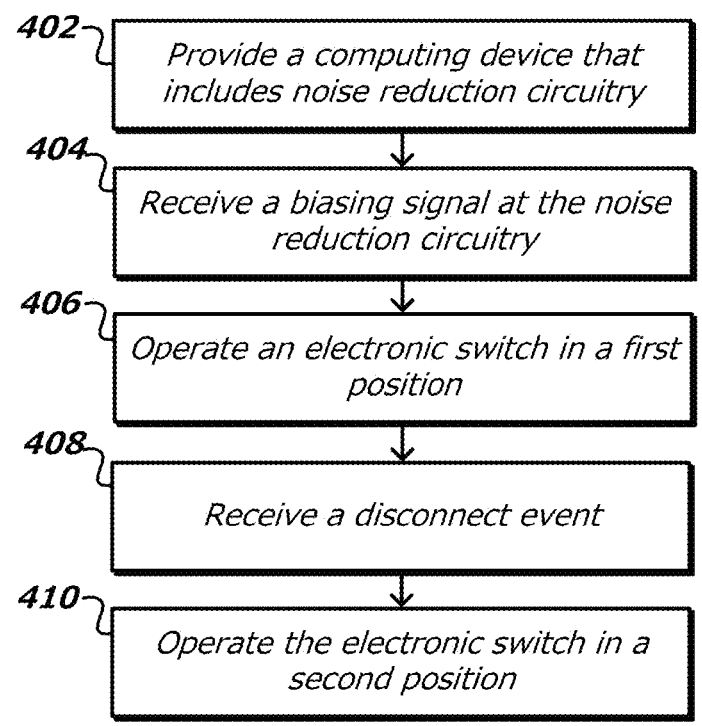
FIG. 4 illustrates an example process for managing the noise in an electronic environment, in accordance with various embodiments.

FIG. 4 illustrates an example of a process for managing noise effects in an electronic environment, in accordance with various embodiments. It should be understood that, for any process described herein, that there can be additional or fewer steps performed in similar or alternative orders, or in parallel, within the scope of the various embodiments unless otherwise stated. A computing device including noise reduction (or control) circuitry is provided 402, where the noise reduction circuitry can include at least an electronic switch. In accordance with an environment, the computing device can include a port to which at least a portion of a first connector of a communication cable can connect. The communication cable, in this example, can include a second connector, where the second connector can be used to connect the computing device (e.g., a mobile phone) to an electronic device (e.g., a personal computer).

When the communication cable connects the computing device to the electronic device, the cable can be used to communicate data and/or power between the computing device and the electronic device. Additionally, when the communication cable connects the computing device to the electronic device, an activation signal (e.g., a biasing signal such as a voltage) can be received 404 at the noise reduction circuitry. In accordance with an embodiment, the biasing signal can be provided by the electronic device, and can be used to bias the electronic switch (i.e., cause the electronic switch to open or close). It should be noted that in some embodiments, the activation signal can cause the switch to mechanically open or close, while in other embodiments, the activation signal can cause the switch to electrically open or close, such as in the case of causing a RF short or RF open.

In response to receiving the biasing signal at the electronic switch, the electronic switch is configured to operate 406 in a first position to connect the first connector of the communication cable to a ground of the computing device. In such a situation, at least a portion of any noise generated at the connector of the first end of the communication cable due to communicating data and/or power will be grounded instead of being coupled to the antenna.

When a disconnect event is received 408 at the noise reduction circuitry, such as in the case of the biasing signal not being received at the noise reduction, the electronic switch is configured to operate 410 in a second position. In this case, the electronic switch provides an open circuit between the first connector of the communication cable and the ground on the computing device, and because the connector will be an electrically floating metal instead of a grounded metal due to the open switch, at least a portion of the radiated and/or received antenna signals will not couple to the connector.

Figure 5:
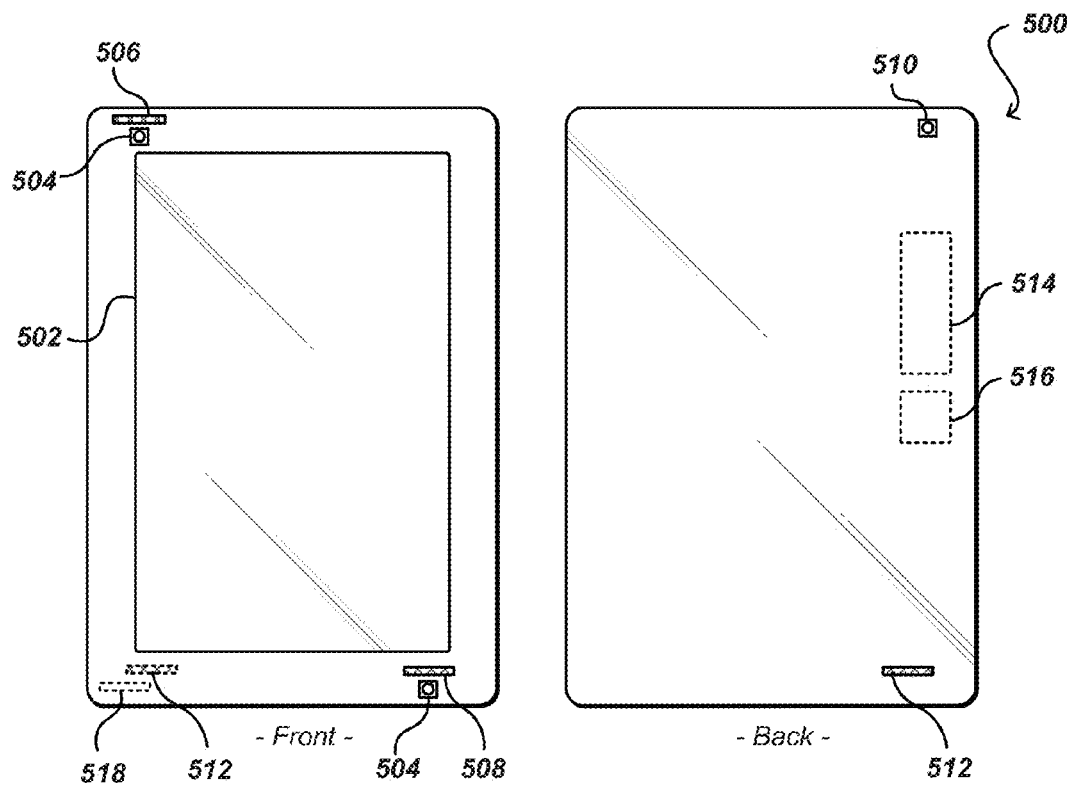
FIG. 5 illustrates front and back views of an example portable computing device that can be used in accordance with various embodiments.

FIG. 5 illustrates front and back views of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one communication mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
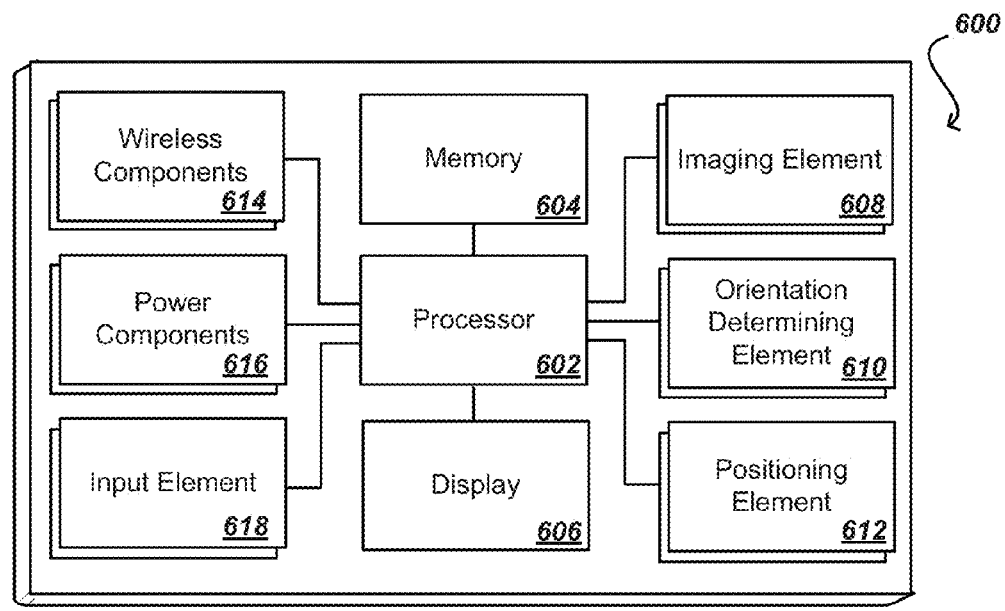
FIG. 6 illustrates an example set of basic components of a portable computing device, such as the device described with respect to FIG. 5.

FIG. 6 illustrates a set of basic components of an electronic computing device 600 such as the device 500 described with respect to FIG. 5. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g., distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

What is claimed is:

1. A computing device for managing noise effects in an electronic environment, comprising:
    an antenna configured to at least receive or radiate a radio frequency (RF) signal, the antenna being coupled to a receiver of the computing device;
    a port for receiving at least a portion of a first connector of a communication cable, the communication cable configured to couple the computing device to an electronic device, the communication cable having a second connector for connecting to the electronic device; and
    noise reduction circuitry including at least an electronic switch, the electronic switch configured to:
        detect a biasing signal from the electronic device, the biasing signal being provided by the electronic device via the communication cable at least when the first connector of the communication is connected to the port of the computing device and the second connector of the communication cable is connected to the electronic device,
        operate in a first position, in response to detecting the biasing signal, to couple the first connector of the communication cable to a ground of the computing device, and
        operate in a second position while not receiving the biasing signal, the second position providing an open circuit between the first connector of the communication cable and the ground on the computing device.

2. The computing device of claim 1, wherein the computing device is configured to:
    receive at least one of data or power between the computing device and the electronic device when the biasing signal is received at the noise reduction circuitry, the biasing signal being used to bias the electronic switch to electrically couple the first connector to the ground of the computing device.

3. The computing device of claim 2, wherein when the electronic switch is biased, at least a portion of any noise generated at the first connector due to communicating the at least one of data or power is electrically shorted to the ground of the computing device.

4. A computing device, comprising:
    a port for receiving at least a portion of a connector of a communication component, the communication component configured to transfer at least an activation signal between the computing device and an electronic device;
    an antenna capable of receiving interference, the antenna being coupled to a receiver of the computing device, the interference being caused by at least one of the at least a portion of the connector being positioned proximate the port of the computing device or communicating at least one of data or power via the connector; and control circuitry that includes at least a switch, the switch configured to:
- receive the at least one of data or power in response to the activation signal being received at the control circuitry,
- couple the connector of the communication component to a ground of the computing device to short at least a portion of interference to the ground of the computing device, the interference being caused due to communicating the at least one of data or power via the connector,
- detect a disconnect event, and
- provide an open circuit between the connector and the ground of the computing device to isolate at least a portion of the interference from the antenna that is caused due to receiving the at least a portion of the connector at the port.

5. The computing device of claim 4, further comprising:
a biasing resistor; and
a direct current (DC) feed inductor, the DC feed inductor being connected between the switch and the biasing resistor, wherein based at least on the activation signal received at the biasing resistor, a biasing voltage is provided to the switch and is used to cause the switch to couple the connector to the ground of the computing device.

6. The computing device of claim 4, further comprising:
a DC blocking capacitor, the DC blocking capacitor connected between the switch and the ground of the portable computing device, wherein the DC blocking capacitor is configured to prevent DC shorting of the switch to the ground of the portable computing device.

7. The computing device of claim 4, further comprising:
an electrostatic discharge (ESD) diode, the ESD diode connected between the ground of the computing device ground and a ground of an electronic device, wherein the ESD is configured to provide ESD protection.

8. The computing device of claim 4, wherein the activation signal is capable of being received from at least one of an electronic device, a wall adapter, or a battery, each of which is capable of being connected to the computing device through the communication component.

9. The computing device of claim 4, wherein in response to receiving a biasing voltage at the control circuitry, the switch is configured to:
operate in a first position to couple the connector of the communication component to the ground of the computing device.

10. The computing device of claim 4, wherein in response to not receiving the activation signal at the control circuitry, the switch is configured to:
operate in a second position, the second position providing an open circuit between the connector of the communication component and the ground of the computing device.

11. The computing device of claim 4, wherein communicating through the connector includes communicating at least one of data or power between the computing device and at least one of an electronic device or a wall adapter, wherein when the communication component communicates the at least one of data or power, at least a portion of interference generated at the connector is shorted to the ground of the computing device.

12. The computing device of claim 4, wherein the antenna is configured to radiate or receive communication signals, wherein when the disconnect event is detected, the communication signals bypasses the connector.

13. The computing device of claim 4, wherein the communication component is one of a universal serial bus (USB) cable, a high-definition multimedia interface (HDMI) cable, a communication dongle, or a peripheral component interconnect (PCI) Express cable.

14. The computing device of claim 4, wherein the disconnect event is at least one of a termination of the activation signal or a disconnect of the communication component from at least one of an electronic device or a wall adapter.

15. A method, comprising:
receiving at least a portion of a connector of a communication component at a port of a computing device, the communication component configured to transfer at least an activation signal between the computing device, the computing device including an antenna capable of receiving interference, the antenna being coupled to a receiver of the computing device, the interference being caused by at least one of the at least a portion of the connector being positioned proximate the port of the computing device or communicating at least one of data or power via the connector;
receiving, at control circuitry at the computing device, the activation signal, the control circuitry including a switch, the switch configured to:
- receive the at least one of data or power between the computing device and the electronic device in response to the activation signal being received at the control circuitry,
- couple the connector of the communication component to a ground of the computing device to short at least a portion of interference to the ground of the computing device, the interference being caused due to communicating the at least one of data or power via the connector,
- detect a disconnect event, and
- provide an open circuit between the connector and the ground of the computing device to isolate at least a portion of the interference from the antenna that is caused due to receiving the at least a portion of the connector at the port.

16. The method of claim 15, wherein the activation signal is capable of being received from at least one of an electronic device, a wall adapter, or a battery, each of which is capable of being connected to the computing device through the communication component.

17. The method of claim 15, further comprising:
receiving, at the control circuitry, the activation signal, the activation signal providing a biasing voltage to the control circuitry; and
causing, based at least on the activation signal, the switch to operate in a first position to couple the connector of the communication component to the ground of the computing device.

18. The method of claim 15, further comprising:
in response to not receiving the activation signal at the control circuitry, operating the switch in a second position, the second position providing an open circuit between the connector of the communication component and the ground of the computing device.

19. The method of claim 15, further comprising:
communicating, by the communication component, at least one of data or power between the computing device and at least one of an electronic device or a wall adapter; and in response to the communication component communicating the at least one of data or power, shorting at least a portion of interference generated at the connector to the ground of the computing device.

20. The method of claim 15, wherein the control circuitry further includes a biasing resistor; and a direct current (DC) feed inductor, the DC feed inductor being connected between the switch and the biasing resistor, wherein based at least on the activation signal received at the biasing resistor, a biasing voltage is provided to the switch and is used to cause the switch to couple the connector to the ground of the computing device.

21. A non-transitory computer readable storage medium storing one or more sequences of instructions executable by one or more processors to perform a set of operations comprising:

receiving at least a portion of a connector of a communication component at a port of a computing device, the communication component configured to transfer at least an activation signal between the computing device, the computing device including an antenna capable of receiving interference, the antenna being coupled to a receiver of the computing device, the interference being caused by at least one of the at least a portion of the connector being positioned proximate the port of the computing device or communicating at least one of data or power via the connector;

receiving, at control circuitry at the computing device, the activation signal, the control circuitry including a switch, the switch configured to:

receive the at least one of data or power between the computing device and the electronic device in response to the activation signal being received at the control circuitry, couple the connector of the communication component to a ground of the computing device to short at least a portion of interference to the ground of the computing device, the interference being caused due to communicating the at least one of data or power via the connector, detect a disconnect event, and provide an open circuit between the connector and the ground of the computing device to isolate at least a portion of the interference from the antenna that is caused due to receiving the at least a portion of the connector at the port.

22. The non-transitory computer readable storage medium of claim 21, wherein the control circuitry further includes a DC blocking capacitor, the DC blocking capacitor connected between the switch and the ground of the portable computing device, wherein the DC blocking capacitor is configured to prevent DC shorting of the switch to the ground of the portable computing device.

23. The non-transitory computer readable storage medium of claim 21, wherein the control circuitry further includes an electrostatic discharge (ESD) diode, the ESD diode connected between the ground of the computing device ground and a ground of an electronic device, wherein the ESD is configured to provide ESD protection.

24. The non-transitory computer readable storage medium of claim 21, further comprising instructions executed by the one or more processors to perform the operations of:

receiving, at the control circuitry, the activation signal, the activation signal providing a biasing voltage to the control circuitry; and causing, based at least on the activation signal, the switch to operate in a first position to couple the connector of the communication component to the ground of the computing device.

25. The non-transitory computer readable storage medium of claim 21, wherein the switch is one of a pin diode, a base-emitter junction diode, a CMOS diode, or a mechanical switch.

\* \* \* \* \*